(12) United States Patent
Brodeur et al.

(10) Patent No.: US 9,176,840 B2
(45) Date of Patent: Nov. 3, 2015

(54) TOOL FOR ANALYZING AND RESOLVING ERRORS IN A PROCESS SERVER

(75) Inventors: Denis Fernand Brodeur, Markham (CA); Ida Seen Leung, Markham (CA); Flannan Lok-Hang Lo, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1153 days.

(21) Appl. No.: 12/622,709

(22) Filed: Nov. 20, 2009

(65) Prior Publication Data

US 2011/0016347 A1 Jan. 20, 2011

(30) Foreign Application Priority Data

Jul. 15, 2009 (CA) .................................. 2672336

(51) Int. Cl.
 *G06F 11/00* (2006.01)
 *G06F 11/32* (2006.01)
 *G06F 11/34* (2006.01)

(52) U.S. Cl.
 CPC .......... *G06F 11/327* (2013.01); *G06F 11/3476* (2013.01)

(58) Field of Classification Search
 CPC ................................................. G06F 11/327
 USPC ............................................................. 714/57
 See application file for complete search history.

(56) References Cited

U.S. PATENT DOCUMENTS

| 6,574,792 B1 | 6/2003 | Easton |
| 2009/0064174 A1* | 3/2009 | Chan et al. .................... 719/313 |

FOREIGN PATENT DOCUMENTS

WO 2007028994 A1 3/2007

OTHER PUBLICATIONS

Author Unknown, Monitoring WebSphere Process Server, Version 6.2.0, Dec. 12, 2008, pp. i-96, IBM Corporation, NY, USA.

* cited by examiner

*Primary Examiner* — Amine Riad
(74) *Attorney, Agent, or Firm* — Lee Law, PLLC; Christopher B. Lee

(57) ABSTRACT

A method for analyzing and resolving problems in a process server is disclosed herein. In one embodiment, such a method may include receiving a log file associated with an application running on the process server. The application may be made up of higher-level service component artifacts, and lower-level implementation artifacts used to implement the higher-level service component artifacts. The method may further include identifying error messages in the log file and determining which implementation artifacts are associated with the error messages. The method may further include mapping the implementation artifacts to service component artifacts associated with the implementation artifacts. The error messages may then be displayed along with their relationship to the service component artifacts. A corresponding apparatus and computer program product are also disclosed and claimed herein.

24 Claims, 11 Drawing Sheets

| Welcome | D:\log\server1\SystemOut.log ✕ |
|---|---|

File (filtered): D:\defect\server1\SystemOut.log

Show Invocation Types > with only Server State and Error Contents (Page 1 of 1)

| Type | Time | Thread ID | Contents |
|---|---|---|---|
| ⊟ ☐ Invocation sequence (ProcessOrder:takeOrder) | 11-Jun-2009 03:29:03.671 | 000000b1 | Start of the invocation |
| ⊟ ☐ Ⓢ Start invoke (ProcessOrder:takeOrder) | 11-Jun-2009 03:29:03.671 | 000000b1 | Start of the componen |
| ☐ Ⓢ ⊞ Start component (ProcessOrder:takeOrder) | 11-Jun-2009 03:29:03.687 | 000000b1 | Start of the componen |
| ☐ Ⓢ Fail component (ProcessOrder:takeOrder) | 11-Jun-2009 03:29:05.125 | 000000b1 | A failure occurred dur |
| ☐ ⊠ Exception | 11-Jun-2009 03:29:05.125 | 000000b1 | CNTR0020E:EJB thre |
| ☐ Ⓢ Fail invoke (ProcessOrder:takeOrder) | 11-Aug-2009 16:14:52.234 | 0000007c | A failure occurred dur |
| ⊟ ☐ Invocation sequence (ProcessOrder:takeOrder) | 11-Aug-2009 16:14:52.234 | 0000007c | Start of the invocation |
| ☐ Ⓢ Start invoke (ProcessOrder:takeOrder) | 11-Aug-2009 16:14:52.281 | 0000007c | Start of the componen |
| ☐ Ⓢ ⊟ Start component (ProcessOrder:takeOrder) | 11-Aug-2009 16:14:52.281 | 0000007c | Taking order for PO: |
| ☐ 🗎 Log message | 11-Aug-2009 16:14:52.281 | 0000007c | id 13455 |
| ☐ 🗎 Log message | 11-Aug-2009 16:14:52.281 | 0000007c | custId11234 |
| ☐ 🗎 Log message | | | |

FIG. 6

| Welcome | D:\log\server1\SystemOut.log ⊠ | | | |
|---|---|---|---|---|
| File: D:\defect\server1\SystemOut.log | | | | |
| Show All Record Types (Hierarchical) > with All Contents (Page 1 of 1) | | | | |
| Type | | Time | Thread ID | Contents |
| ☐ 🗎 Log message | | 11-Jun-2009 03:29:01.843 | 00000165 | SRVE0250I: Web Mc |
| ☐ 🗎 Log message | | 11-Jun-2009 03:29:01.859 | 00000165 | WSVR0221I: Applica |
| ⊟ ☐ 🔗 Invocation sequence (ProcessOrder:takeOrder) | | 11-Jun-2009 03:29:03.671 | 000000b1 | |
|    ☐ ⊘ Start invoke (ProcessOrder:takeOrder) | | 11-Jun-2009 03:29:03.671 | 000000b1 | Start of the invocation |
|    ⊞ ☐ ⊘ Start component (ProcessOrder:takeOrder) | | 11-Jun-2009 03:29:03.687 | 000000b1 | Start of the compone |
|    ☐ ⊘ Fail component (ProcessOrder:takeOrder) | | 11-Jun-2009 03:29:05.125 | 000000b1 | A failure occurred du |
|    ☐ ⊠ Exception | | 11-Jun-2009 03:29:05.125 | 000000b1 | CNTR0020E:EJB thr |
|    ☐ ⊘ Fail invoke (ProcessOrder:takeOrder) | | 11-Jun-2009 03:29:05.125 | 000000b1 | A failure occurred du |
| ☐ ⊠ FFDC | | 11-Jun-2009 14:24:27.062 | 00000673 | FFDC0009I:FFDC op |
| ☐ ⊠ FFDC | | 11-Jun-2009 14:24:27.265 | 00000673 | FFDC0010I:FFDC op |
| ☐ 🗎 Log message | | 11-Jun-2009 18:29:44.812 | startup | *****Start Display Cu |
| ☐ 🗎 Log message | | 11-Jun-2009 18:29:44.812 | 000000d0 | TRAS0017I: The star |

TOOL FOR ANALYZING AND RESOLVING ERRORS IN A PROCESS SERVER

BACKGROUND

1. Field of the Invention

This invention relates to Service Component Architecture (SCA), and more particularly to apparatus and methods for analyzing and resolving SCA runtime errors in process servers, such as WebSphere Process Server.

2. Background of the Invention

Service Component Architecture (SCA) is a set of specifications which describe a model for building applications and systems using a service-oriented architecture (SOA). SCA extends and complements prior approaches to implementing services, and builds on open standards such as Web services. WebSphere Process Server (WPS) is one example of a runtime engine that supports SCA artifacts.

WebSphere Integration Developer (WID) is an integrated development environment for building applications based on SOA. WID is the primary authoring tool for WPS. WID users typically use SCA to build their applications and services using SOA. SCA provides a layer of abstraction that hides the underlying implementation details from the user. This allows users to focus on business-level concepts without worrying about actual implementation of the services. The service implementation can be virtually anything, such as conventional object-oriented programming languages (e.g., Java, C++) and XML-centric languages (e.g., BPEL, XSLT).

WebSphere Process Server reports the states and activities of applications deployed on the process server using log files. Everything from system printouts to errors and exceptions may be written to these log files. As a result, these log files are the most primitive tool to diagnose and correct application problems on the process server. However, since all services and applications running on the process server may record their status in log files, the log files can grow quickly and become very large. This can make it very difficult to identify records of interest in the log files.

In WID, the conventional "console" view monitors log files that are generated by the WPS process server. Instead of manually locating the log files in the file system, the console view creates a live session that monitors the log files (e.g., the "SystemOut.log" and "SystemErrlog" log files) in real time. The console view is a plain text view that displays the messages written to the log files. It does not provide advanced features such as filtering and message correlation. As a result, when an error occurs, users may have a difficult time finding log messages that describe the error. If multiple errors occur at the same time, the users may become more frustrated since there is no easy way to correlate exceptions with particular problems they have observed. Furthermore, some services on the WPS dump error details called First-Failure Data Capture (FFDC) in separate files. These files can be very difficult to locate because they are assigned random names. These random names make it easy to make a mistake when retrieving or examining FFDC files.

The Test and Performance Tools Platform (TPTP) log analyzer provides another mechanism for analyzing log files generated by the WPS process server. The TPTP log analyzer is a standalone Rich Client Platform (RCP) application that displays log messages in a sequential order. Although the TPTP log analyzer is better suited for problem determination, it is not suited to WID users because it provides information regarding errors and problems only at the J2EE abstraction layer. This is the low-level layer used to implement most WPS high-level artifacts and not the high-level abstraction level that users are coding in. This means that WID users must know how the high-level abstractions are implemented in order to perform the necessary mapping from the low-level implementation artifacts to the high-level artifacts.

SUMMARY

In view of the foregoing, the present invention provides apparatus and methods for analyzing and resolving errors in process servers, such as WebSphere Process Server or other vendor-specific process servers. Further provided are apparatus and methods to show how errors or problems in a process server are related to high-level artifacts (e.g., SCA artifacts). Further provided are apparatus and methods to filter and/or search for log records in a log file. Yet further provided are apparatus and methods to fix errors in SCA artifacts once errors are identified. The features and advantages of the invention will become more fully apparent from the following description and appended claims, or may be learned by practice of the invention as set forth hereinafter.

Consistent with the foregoing, a method for analyzing and resolving problems in a process server is disclosed herein. In one embodiment, such a method may include receiving a log file associated with an application running on the process server. The application may be made up of higher-level service component artifacts, and lower-level implementation artifacts used to implement the higher-level service component artifacts. The method may further include identifying error messages in the log file and determining which implementation artifacts are associated with the error messages. The method may further include mapping the implementation artifacts to service component artifacts associated with the implementation artifacts. The error messages may then be displayed along with their relationship to the service component artifacts. In this way, the user is able to see how errors or failures relate to higher-level service components that the user is coding in.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 5 shows the log viewer with one type of filter applied;

FIG. 6 shows the log viewer with another type of filter applied;

DETAILED DESCRIPTION

Figure 1:
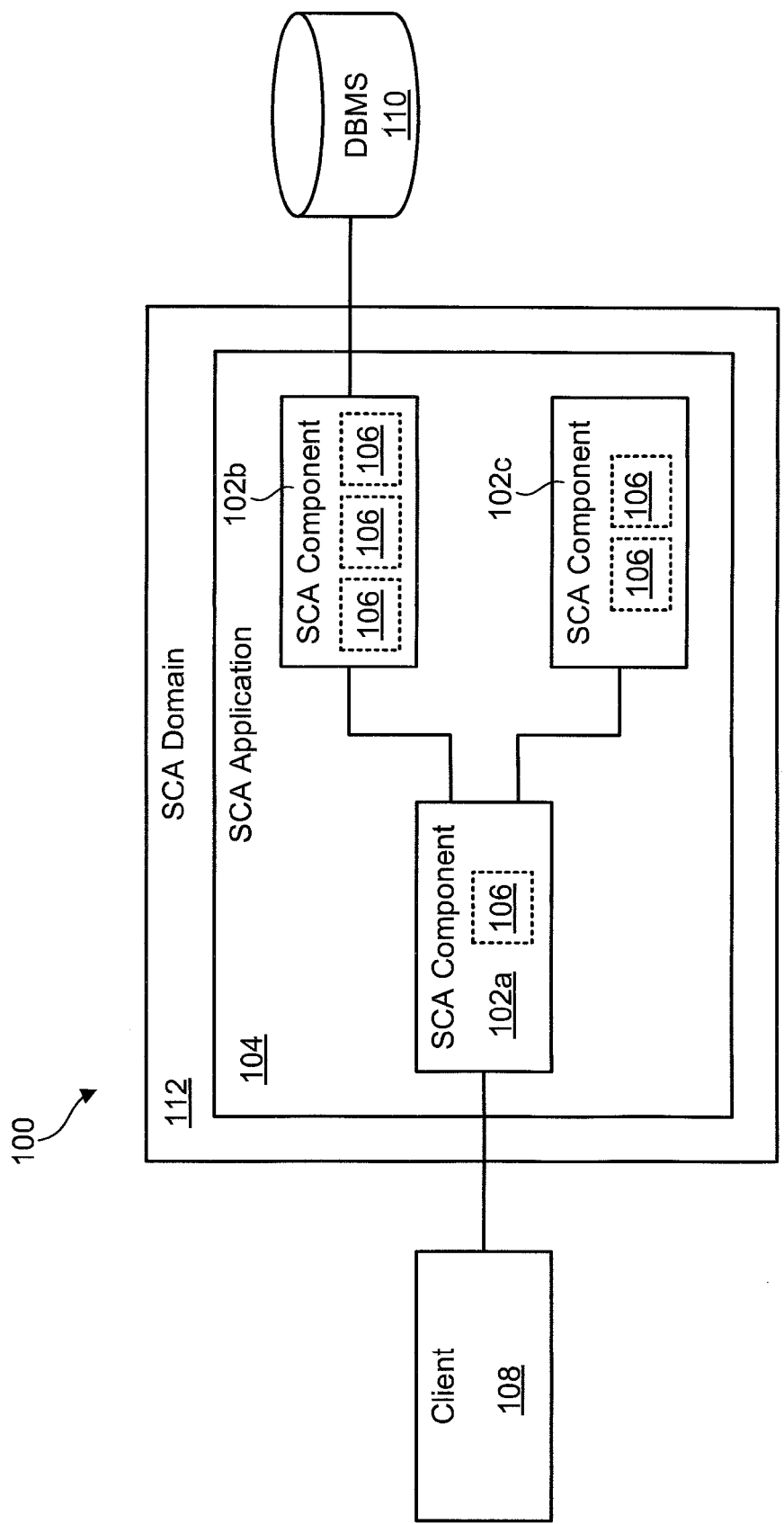
FIG. 1 is a high-level block diagram showing one example of an application incorporating one or more SCA components.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, certain aspects of the invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, certain aspects of the invention may take the form of a computer program product embodied in any tangible storage medium having computer-usable program code stored on the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of processes, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one very simple example of SCA architecture 100 comprising a single SCA application 104 is illustrated. The architecture 100 is shown by way of example to provide a general overview of SCA and is not intended to be limiting. As shown, the architecture 100 includes a single SCA application 104 comprising several high-level SCA components 102*a-c*. Each of the components 102*a-c* may be built with the same technology or different technologies. The components 102*a-c* may run inside the same operating system process, in different processes on the same machine, or across two or more connected machines The SCA components 102*a-c* may be implemented using one or more low-level implementation artifacts 106. These low-level artifacts 106 may include, for example, Java, C++, Business Process Execution Language (BPEL), or XSLT artifacts 106, to name just a few.

As shown in FIG. 1, the SCA application 104 may be accessed by external non-SCA clients 108, such as JavaServer Pages (JSPs), Web service clients, or the like. Service components 102*a-c* within the SCA application 104 may access data stores, such as databases 110. The SCA application 104 may run within an SCA domain 112. The SCA domain 112 may include runtimes installed on various machines and associated with particular vendors. For example, IBM's WebSphere Process Server (WPS) is one example of an SCA domain 112 in which an SCA application 104 may run. Nevertheless, the apparatus and methods disclosed herein are not limited to the WPS domain 112, but may include a wide variety of vendor-specific SCA domains 112. All suitable SCA domains 112 are intended to fall within the scope of the invention. For purposes of this disclosure, the phrase "process server" is used to refer to SCA domains or runtimes able to execute SCA program code, regardless of the vendor.

Figure 2:
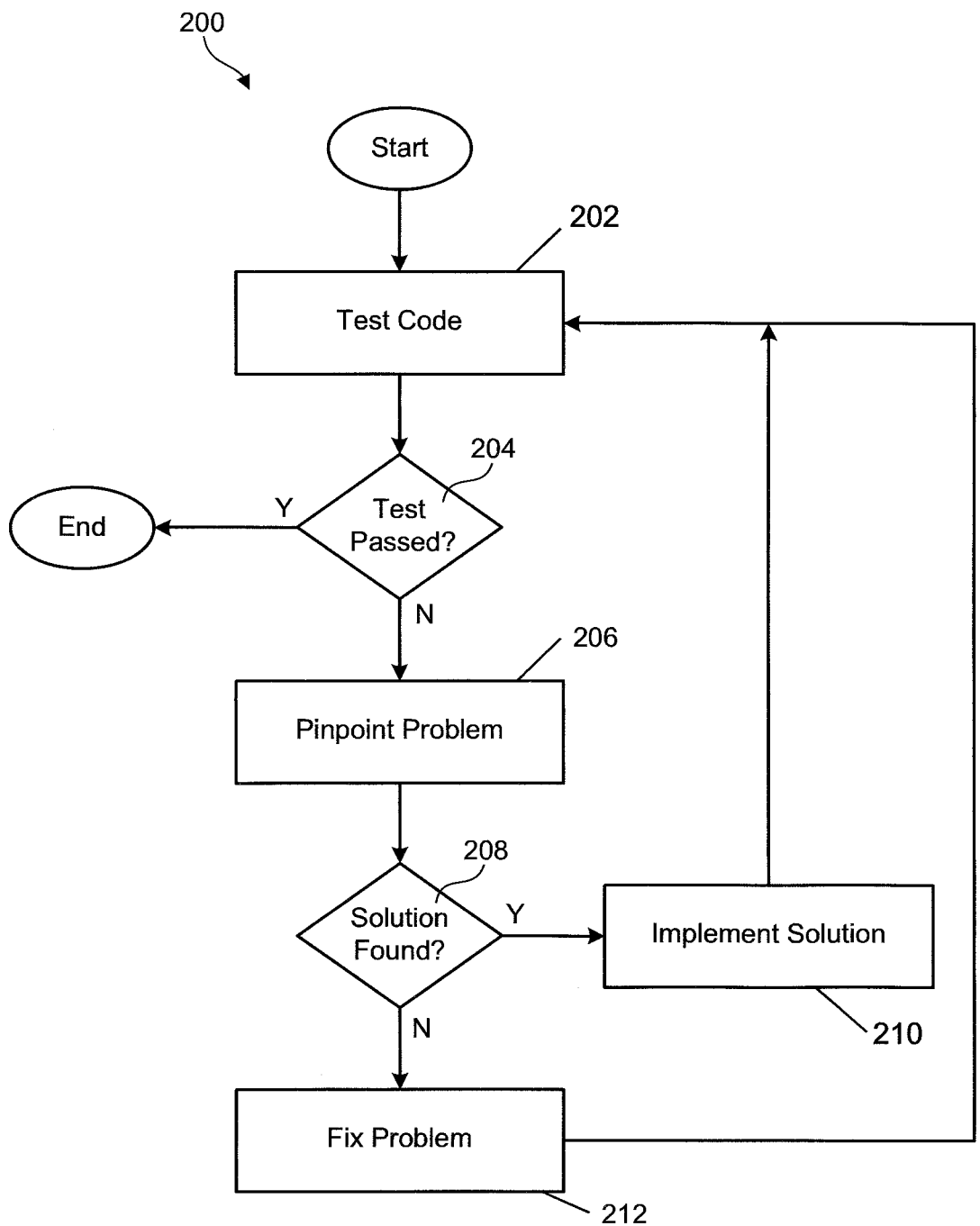
FIG. 2 is a flow chart showing one example of a method for analyzing and resolving a problem with an application running on a process server.

FIG. 2 shows one example of a method 200 that a user may follow when analyzing and resolving a problem (e.g., an error or failure). As shown, the user may initially test SCA code (step 202), such as by testing an SCA artifact 102 or a lower-level implementation artifact 106 in the SCA code. If the test does not pass (step 204, N), the user may proceed to pinpoint the problem (step 206). Once the problem is pinpointed, the user may attempt to find an existing solution to the problem (step 208). If a solution is found (step 208, Y), then the user may implement the solution (step 210). If a solution is not found (step 208, N), then the user may proceed to fix the problem by creating a new solution such as writing or modifying program code to resolve the problem (step 212). Once the problem is fixed, the user may retest the code (step 202). If the code passes the test (step 204, Y), then the method 200 ends and the problem is resolved. If the code fails the test, the user repeats the steps previously described until the problem is solved. Ideally, the user is able to diagnose and resolve the problem at the abstraction level the user is coding in. For example, if the user is coding at the SCA service component level, the user will ideally be able to identify and resolve the problem at the SCA service component level.

Figure 3:
FIG. 3 is an example of a log viewer showing SCA invocations in a hierarchical format.

Referring to FIG. 3, one example of a log viewer 300 (or graphical user interface 300) to aid a user in analyzing and resolving a problem is illustrated. As will be shown in more detail hereafter, the log viewer 300 provides a dynamic and interactive GUI that can correlate and filter a variety of disparate log information, as well as tie the log information to programming artifacts. Where the log viewer 300 is used with WebSphere Process Server, the log viewer 300 may replace the traditional "console" view in WebSphere Integration Developer (WID). In general, the log viewer 300 provides a mechanism for users to perform problem determination and application execution discovery at the correct level of abstraction in the WID environment. More specifically, the log viewer 300 correlates SCA invocations with other log messages so that users can see exactly what has happened during the entire invocation chain.

In the illustrated example, the log viewer 300 includes four columns 302a-d displaying different types of information. For example, a first column 302a shows SCA invocations in a hierarchical list. Each item in the column 302a may include a number of sub-items that can be viewed or hidden by clicking the "+" and "−" symbols to the left of the item. The sub-items may be indented with respect to higher-level items. In certain embodiments, the higher-level items may represent invocations of higher-level SCA components whereas the lower level items may represent invocations of lower-level implementation artifacts associated with the higher-level SCA components. In this particular view, the log viewer 300 shows invocations of high-level SCA components while hiding invocations of lower-level implementation artifacts.

In selected embodiments, each item in the hierarchical list 302a includes a time-stamp 302b showing when the invocation occurred, a thread ID 302c showing which threads were used to run the invocation, and content 302d providing information about the invocation. The content 302d may be formatted and filtered in such a way to make it highly human-readable. Much of this information 302b, 302c, 302d may be extracted from the log records in the log file.

In certain embodiments, the log viewer 300 is configured to view invocations in real-time as records are added to a log file (thereby providing a "live" view). The log viewer 300 may also provide functionality to view past invocations. In certain embodiments, scrollbars (not shown) or other GUI widgets may be used to navigate or scroll though information presented in the log viewer 300.

Various optimizations may be made to improve the performance and usability of the log viewer 300. For example, the log viewer 300 may be configured such that it is not based on the Eclipse Modeling Framework (EMF). This will eliminate overheads associated with creating or loading EMF resources. The log viewer 300 may also be configured such that it does not process every single line in a log file. Instead, it may only process the first few bytes of each line and cache them as needed. Since reading data from disk is very slow, doing as few reads as possible will speed up parsing of the log files. The log viewer 300 may also partition information into multiple pages. By limiting the number of messages displayed on a page, performance may be improved since the amount of information the viewer 300 needs to process at one time is reduced.

Since errors written to log files originate from underlying implementation artifacts and not the higher-level SCA artifacts, apparatus and methods are needed to map the errors to higher-level SCA artifacts. In selected embodiments, the log viewer 300 uses the Cross-Component Tracing (XCT) feature in WPS to correlate log messages and errors with SCA invocations. The log viewer 300 may use this information to list SCA components and their relationship to errors or other failures.

In certain embodiments, the XCT runtime may dump records (hereinafter referred to as "XCT markers") denoting the SCA invocations into the log files in an encoded manner, such as the following:

"07e8a3dd-ddab-4640-be64-54345fc78d94 BEGIN 33ad334e-8f42-4ae0-b4ba-ed1ddb5c4bed00000000-cccc-2008-cccc-cccccccccc2 SCA(Call preRefInvokeOrderEntry%7Bhttp%3A%2F%2F www.ibm.com%2Fxmlns%2Fprod% 2FWebSphere%2Fscd1%2F6.0.0%7DProcessOrder % 2FOrder ProcessingInterface.takeOrderAssoc (Filexct%5C2008-10-18-2%5C33 ad334e-8f42-4ae0-b4ba-ed1ddb5c4bed.in.xml))").

To make these records more human readable, the log viewer 300 may translate these records into a more readable form, such as "Start of the Invocation of Operation ProcessOrder: takeOrder in Module OrderEntry". The log viewer 300 may also filter these records such that only the most relevant part of the record (i.e., the content payload) is shown to users. Since users may want to examine the original content of the XCT markers, both translated and raw record content may be provided, such as in the "find" and/or "properties" dialog boxes illustrated in FIGS. 7 and 8.

Figure 4:
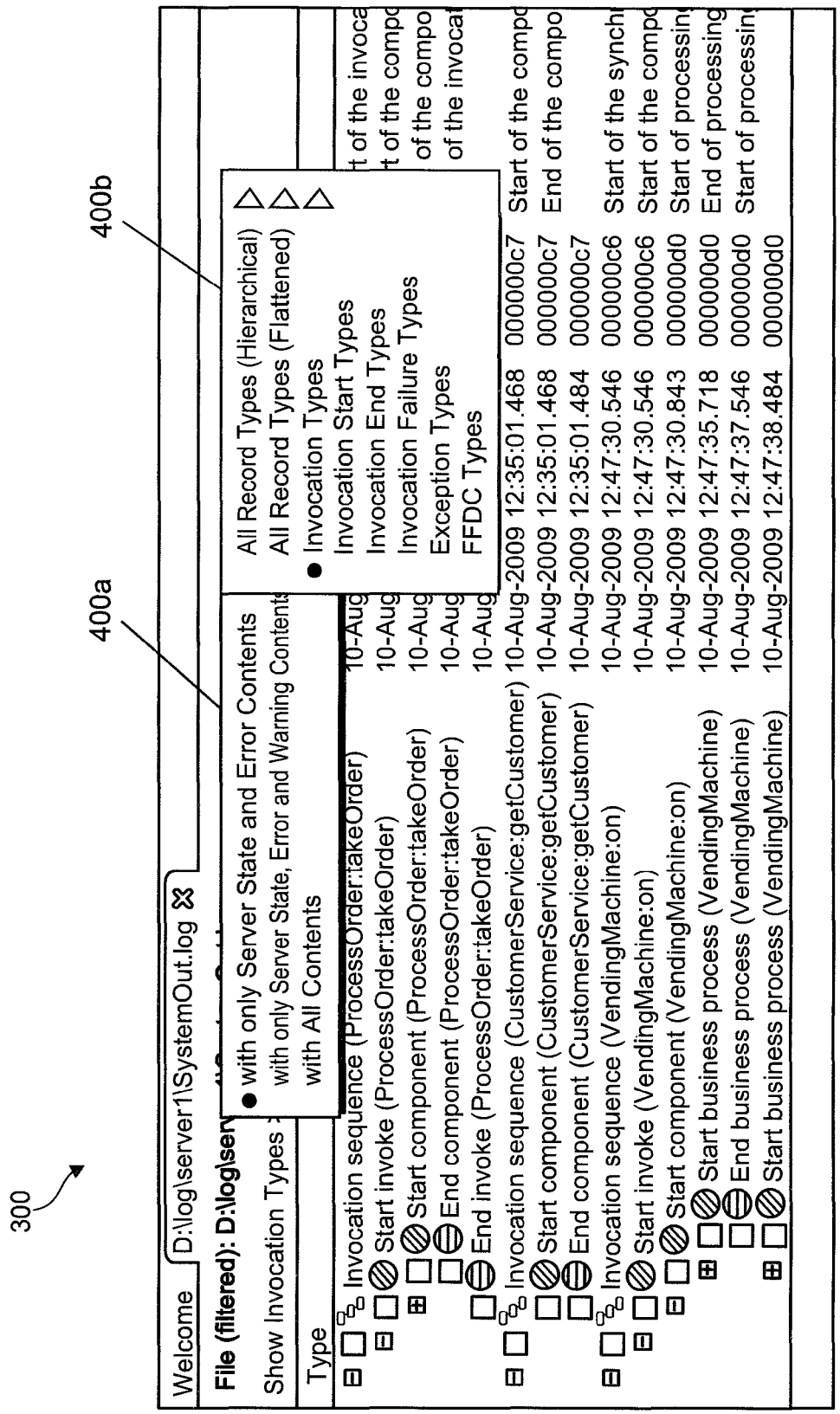
FIG. 4 is an example of the log viewer showing a list of pre-defined filters to filter log records.

Referring to FIG. 4, because log files may become quite large, the sheer volume of information may make the problem determination and resolution process more difficult. That is, the user may need to sift through a large amount of irrelevant or uninteresting information to locate what he or she is looking for. In selected embodiments, the log viewer 300 may provide a set of pre-defined filters to enable a user a user to filter out undesired records. When the user locates a desired record or message in a log file, the user may use a less restrictive filter to show the context around the record or message. In this way, the filters allow the user to view data from different levels in the hierarchy and with different levels of granularity.

For example, as shown in FIG. 4, in selected embodiments, a menu 400a, 400b may enable a user to select various different filters. In the illustrated embodiment, the menu has two levels 400a, 400b. The first level 400a may allow the user to display log records "with only Server State and Error Contents," "with only Server State, Error, and Warning Contents," or "with All Contents." The second level 400*b* may allow the user to display "All Records Types" in a hierarchical format, "All Records Types" in a flattened format, "Invocation Types," "Invocation Start Types," "Invocation End Types," "Invocation Failure Types," "Exception Types," and "FFDC Types." For example, the log viewer 300 in FIG. 4 is configured to show "Invocation Types" "with only Server State and Error Contents." Invocation types may include invocation start types, invocation end types, invocation failure types, exception types, and FFDC types. In this particular example, the log viewer 300 shows invocation start types and invocation end types, which both have circular shapes associated therewith. The darker circles represent invocation start types and the lighter circles represent invocation end types.

FIG. 5 shows another example of the log viewer 300 with the filter set to display "Invocation Types" "with only Server State and Error Contents." In this example, the log viewer 300 shows an exception type in addition to invocation start types and invocation end types. The exception type has been selected with a mouse pointer or other selection mechanism, as shown by the highlighting.

FIG. 6 shows an example of the log viewer 300 with the filter set to display "All Record Types" in a hierarchical format "with All Contents." In this example, the log viewer 300 shows FFDC types and other log messages in addition to the exception type, invocation start types, and invocation end types previously shown. As can be seen, once the exception type has been selected (as shown in FIG. 5), changing the filter will show records and messages around the exception type, thereby providing addition context around the exception type.

Figure 7:
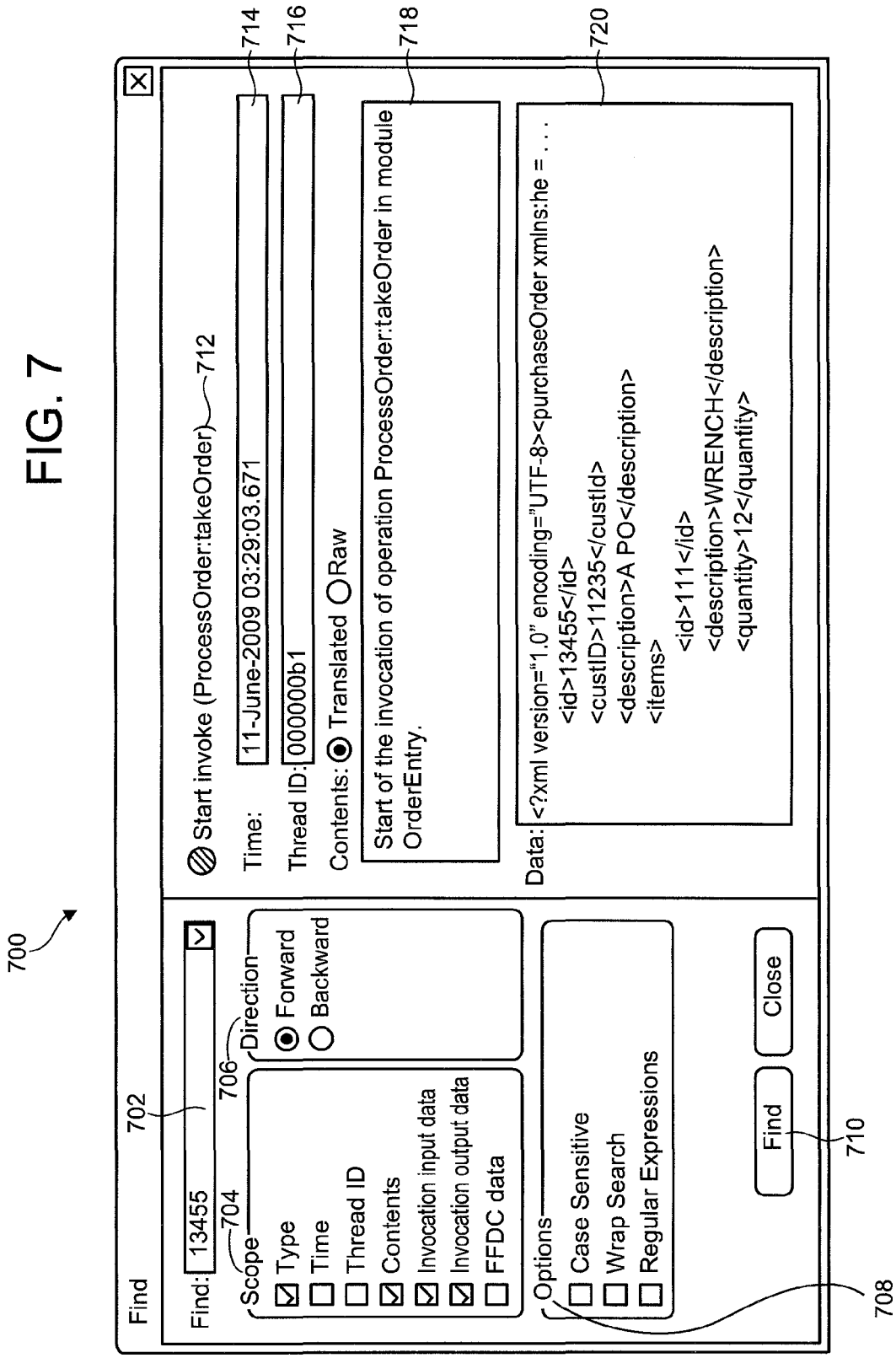
FIG. 7 is an example of a dialog box for searching log records.

Referring to FIG. 7, apparatus and methods in accordance with the invention may enable a user to search a log file for errors or other records, or search for data that was processed in association with a particular error or other record. A "find" dialog box 700 or other GUI may be used to conduct such a search. As shown, the dialog box 700 may include a text box 702 or other GUI widget 702 to enable a user to enter a search term. The dialog box 700 may also allow the user to designate the scope of the search. For example, the scope of the search may be limited to the type field, the time-stamp field, the thread ID field, the contents field, other fields, or combinations thereof. The dialog box 700 may also allow the user to search through the log file in a desired direction 706, such as forward or backward through the log file. Other search options 708 may also be provided. Once desired search parameters are designated, a "find" button 710 may be clicked to execute the search.

If an executed search finds a matching record, the details of the matching record may be displayed. For example, the name 712 of a service component, a timestamp 714 associated with the invocation of the service component, a thread ID 716 associated with the execution of the service component, and/or contents 718 associated with the service component (either in a translated or raw format) may be displayed. In selected embodiments, the search results may also display the data 720 (in this example XML data) that was passed into or out of the component when the component was executed. This data 720 is helpful since many times incorrect or incomplete data 720 is the cause of an error or other failure in a service component.

Once an error is located, the log viewer 300 may allow a user to open a suspicious service component in an editor, such as in the WID Assembly Diagram. Opening the service components may reveal lower-level implementation artifacts (e.g., Java files, BPEL artifacts, etc.). The lower-level implementation artifacts may then be selected and opened in corresponding editors (e.g., a Java editor, a BPEL artifact editor) to inspect the underlying implementation code to further pinpoint and/or fix the error. These editors may allow the user to modify the code or write new code to fix the error.

Figure 8:
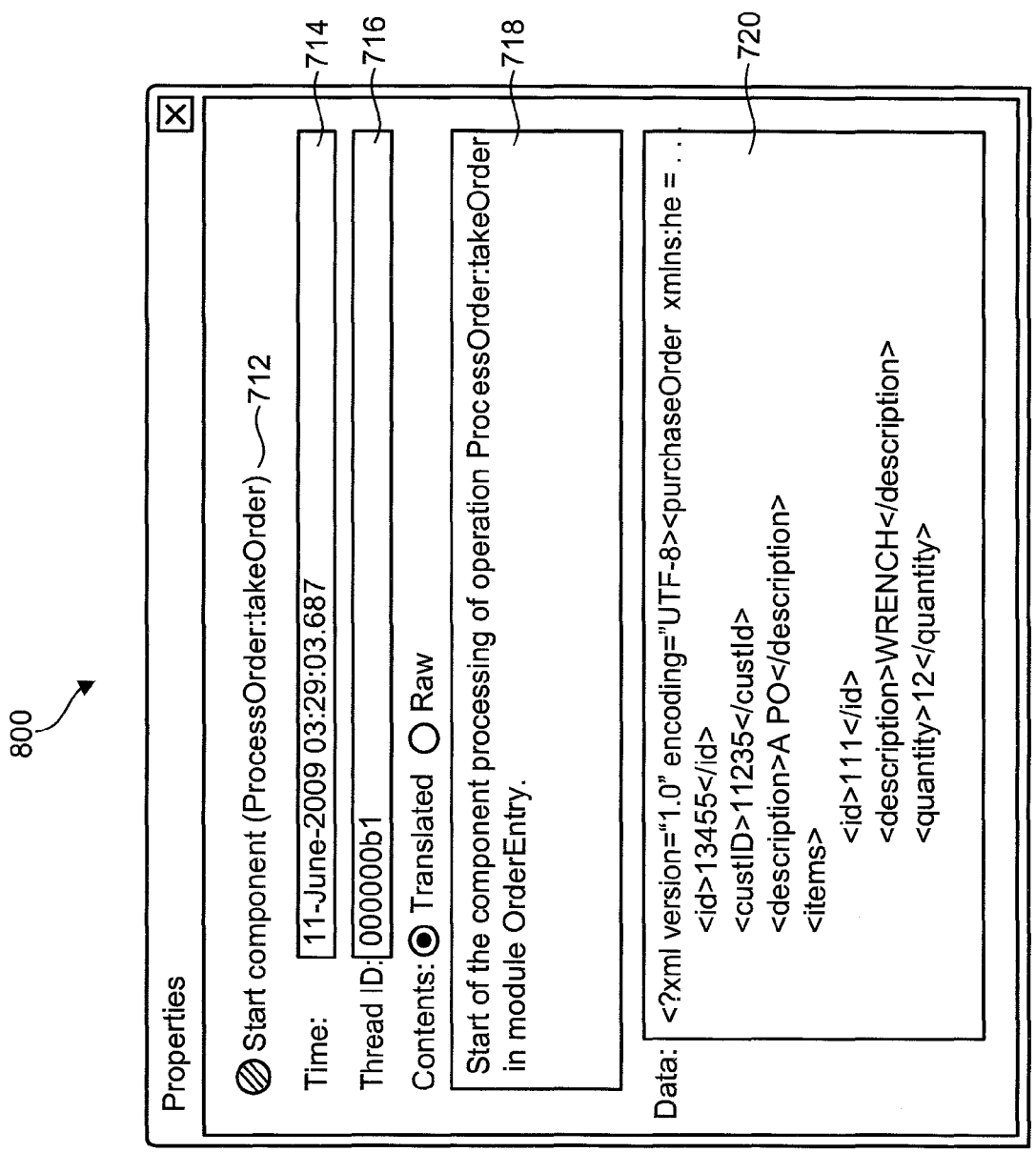
FIG. 8 is an example of a dialog box showing properties for a particular log record.

Referring to FIG. 8, in other embodiments, a "properties" dialog box 800 may be used to display much of the same information described in FIG. 7. This dialog box 800 may be viewed, for example, by right clicking a record in the log viewer 300 and selecting a "properties" option. Like the "find" dialog box 700 previously described, the properties dialog box 800 may display the name 712 of a service component, a timestamp 714 associated with the invocation of the service component, a thread ID 716 associated with the execution of the service component, contents 718 associated with the service component, and/or data 720 that was passed into or out of the service component when the component was invoked. In certain embodiments, the ability to gather data associated with an invocation may require that the Cross-Component Trace feature with Data Snapshot be turned on in WID.

Figure 9:
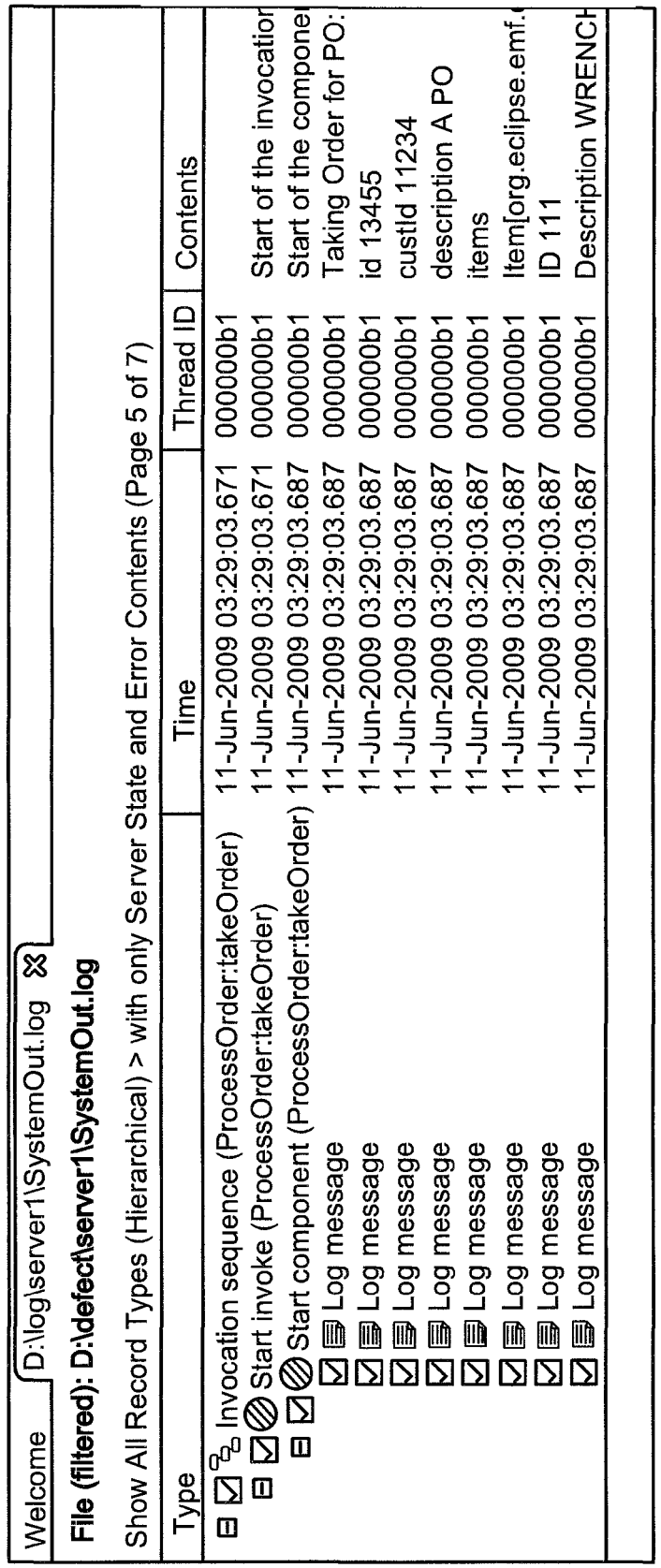
FIG. 9 is an example of the log viewer showing how log records may be selected for import into a test client.

Referring to FIG. 9, in selected embodiments, once a fix has been applied to failing invocations (in the WID Assembly Diagram or other editor), the invocations may be selected in the log viewer 300 and imported into a test client where they may be re-run to verify that the fix actually works. As shown in FIG. 9, a checkbox next to each log record may allow the record to be selected with a checkmark. Other methods for selecting the records are also possible. In selected embodiments, selecting an item in the list will also select each sub-item associated with the item in the list. Once the desired selections are made, the service components and associated lower-level implementation artifacts may be imported into the test client.

Figure 10:
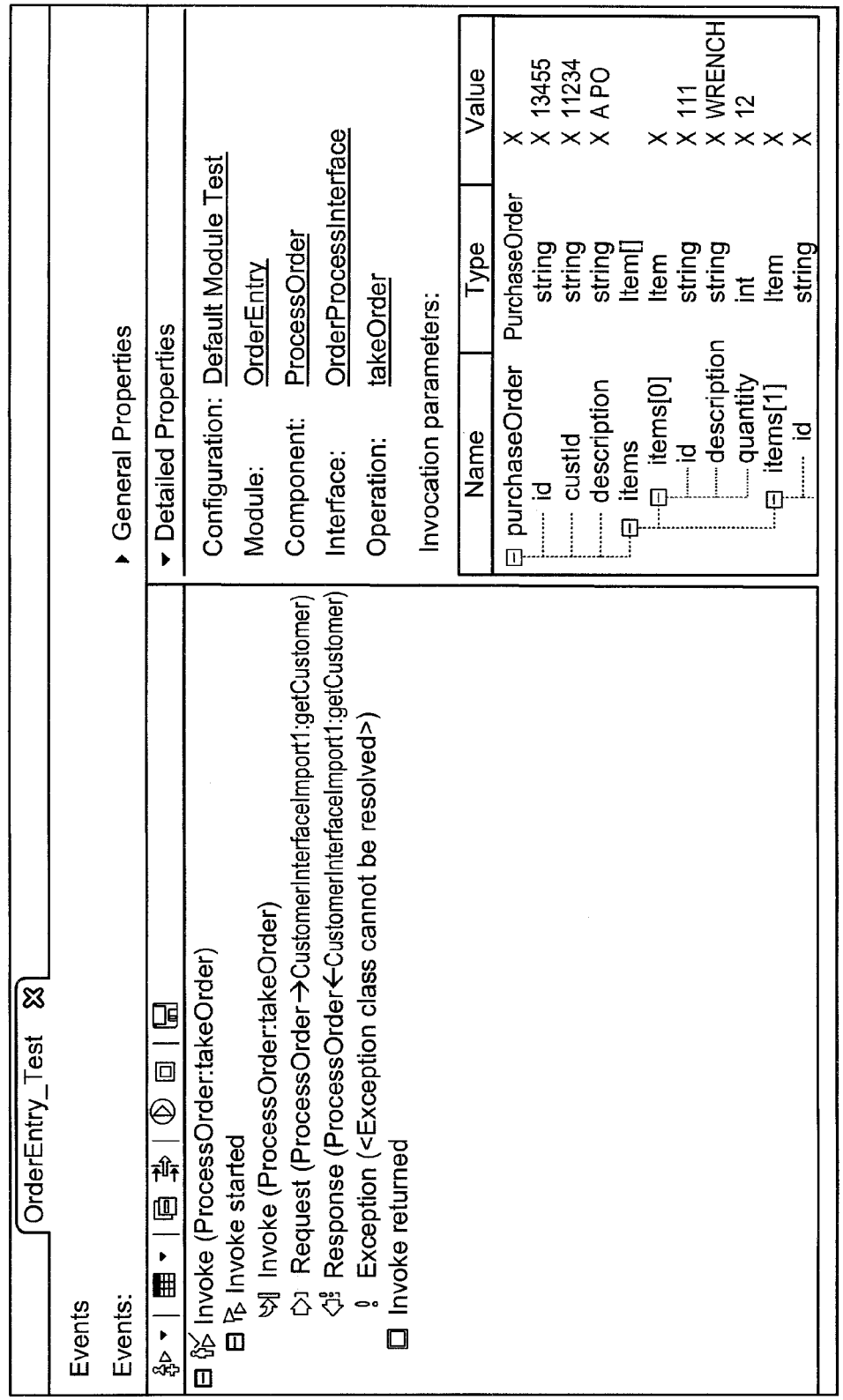
FIG. 10 is an example of a graphical user interface (GUI) for a test client.

Referring to FIG. 10, one example of a graphical user interface (GUI) 1000 or viewer 1000 associated with a test client is illustrated. In this example, the viewer 1000 is representative of the WID test client although the invention is not limited to this test client. Upon importing appropriate XCT markers into the WID test client, the test client is able to import and re-run the failing invocations to verify that a fix actually solves the problem. The WID test client may import the appropriate invocations by processing details in the XCT markers, such as details indicating the component and operation being invoked. The test client may then reconstruct the invocation events so that they can be re-run and observed.

The left hand side of the viewer 1000 shows a hierarchy of the invocation test trace. The right hand side displays the detailed properties of the test events. For example, the detailed properties show what component (i.e., "ProcessOrder") and operation (i.e., "takeOrder") are being invoked. The "invocation parameters" show what data is being processed by the component and operation. This allows data associated with the error to be imported and reprocessed to verify that the fix is effective when operating on the same data. Other data may also be imported to ensure that the fix works with other types of data.

Figure 11:
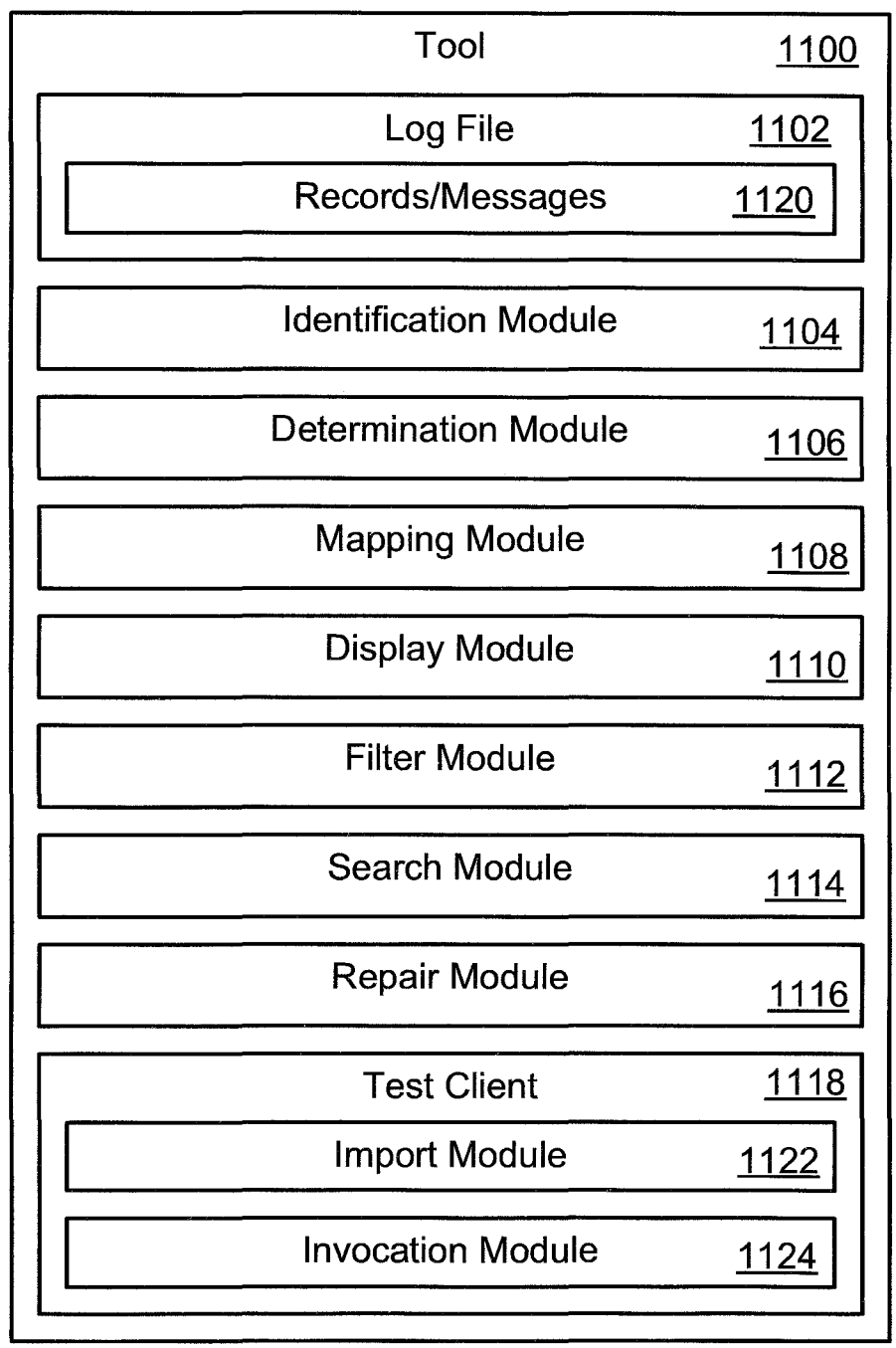
FIG. 11 is a high-level block diagram showing various modules that may be included in a tool (apparatus) in accordance with the invention.

Referring to FIG. 11, at a very high level, a tool 1100 (or apparatus 1100) in accordance with the invention may include one or more modules to implement the functionality described in FIGS. 3 through 10. These modules may be embodied in hardware, software configured to operate hardware, firmware configured to operate hardware, or a combination thereof. In selected embodiments, these modules may include one or more of a log file 1102, an identification module 1104, a determination module 1106, a mapping module 1108, a display module 1110, a filter module 1112, a search module 1114, a repair module 1116, and a test client 1118 (which may include an import module 1122 and an invocation module 1124).

According to a sample embodiment, the apparatus 1100 comprises a processor and a memory. The processor may comprise one or more processors operating on the process server or remotely. The memory may comprise one or more memory devices suitable for storing modules in the form of program code either on the process server or remotely. The various modules described above may be stored on the memory and executed by the processor.

As previously mentioned, a log file 1102 may contain log records 1120 or messages 1120 associated with the state and activities of applications running on the process server. Everything from system printouts to errors and exceptions may be written to these log files 1102. An identification module 1104 may be configured to identify error messages, along with other messages and records, in the log file 1102. A determination module 1106 may be configured to determine which implementation artifacts (e.g., Java files, C++ files, BPEL artifacts, XSLT artifacts, etc.) are associated with the error messages. This information may, in certain embodiments, be extracted from the log file 1102.

A mapping module 1108 may be configured to map the implementation artifacts to service component artifacts that are associated with the implementation artifacts. For example, the mapping module 1108 may use the Cross-Component Tracing (XCT) support in WPS to correlate low-level implementation artifacts associated with an error to higher-level SCA artifacts. A display module 1110 may display the error messages and their relationship to the SCA artifacts. This may be accomplished, for example, by displaying the error messages and associated SCA artifacts using the log viewer 300 illustrated in FIGS. 3 through 6, although other GUI interfaces are also possible.

A filter module 1112 may enable a user to filter out undesired log records and messages or, conversely, display desired log records or messages to the exclusion of others. In certain embodiments, the filter module 1112 may provide a set of pre-defined filters to enable a user to filter out undesired records. These filters may allow the user to view the data from different levels (or elevations) in the hierarchy and with different levels of granularity.

A search module 1114 may enable a user to search through a log file 1102 for error messages or other records, or search for data that was processed by a particular SCA invocation. In certain embodiments, the search module 1114 may allow the user to designate the scope of the search or allow the user to search through the log file 1102 in a desired direction, such as forward or backward through the log file 1102. If an executed search locates a matching record or message, the details of the matching record or message may be displayed.

A repair module 1116 may enable a user to repair an artifact when an error or failure has occurred. For example, the repair module 1116 may enable a user to open a suspicious service component in an editor, such as the WID Assembly Diagram. The WID Assembly Diagram may allow the user to select and open SCA artifacts to reveal lower-level implementation artifacts (e.g., Java files, BPEL artifacts, etc.). This, in turn, allows the user to select and open the low-level implementation artifacts in corresponding editors (e.g., a Java editor, a BPEL artifact editor, or the like) to inspect and/or modify the underlying implementation code.

A test client 1118, such as a WID test client 1118, may be provided to test programming artifacts once they have been repaired. In certain embodiments, the test client 1118 may include an import module 1122 and an invocation module 1124. The import module 1122 may enable the user to import programming artifacts into the test client 1118. For example, the WID test client 1118 may import XCT markers which may allow it to import failing SCA invocations. An invocation module 1124 may then be used to invoke the invocations to verify that a fix solves an error or other problem.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for analyzing and resolving problems in a process server, the method comprising:
   receiving a log file associated with an application running on the process server, the application comprising higher-level service component artifacts, and lower-level implementation artifacts used to implement the service component artifacts;
   identifying error messages in the log file;
   determining what implementation artifacts are associated with the error messages;
   mapping the implementation artifacts to service component artifacts that are associated with the implementation artifacts; and
   displaying the error messages and their relationship to the service component artifacts.

2. The method of claim 1, wherein the process server is a runtime engine that supports Service Component Architecture artifacts.

3. The method of claim 1, wherein the service component artifacts are Service Component Architecture (SCA) artifacts.

4. The method of claim 1, wherein the implementation artifacts are implemented in at least one of object-oriented programming languages and XML-centric programming languages.

5. The method of claim 1, further comprising enabling a user to import artifacts associated with an error message into a test client.

6. The method of claim 5, further comprising enabling the user to import data elements associated with the error message into the test client.

7. The method of claim 6, further comprising enabling a user to invoke, in the test client, the implementation artifacts associated with the error message to operate on the data elements.

8. The method of claim 1, further comprising providing functionality to enable the user to apply a fix to the implementation artifacts.

9. The method of claim 8, further comprising providing functionality to enable the user to re-run the implementation artifacts with applied fixes until an error is resolved.

10. An apparatus for analyzing and resolving problems in a process server, the apparatus comprising:
a memory;
a processor functionally connected to the memory;
a log file stored on said memory and associated with an application running on the process server, the application comprising higher-level service component artifacts, and lower-level implementation artifacts used to implement the service component artifacts;
an identification module stored on said memory and executable by said processor to identify error messages in the log file;
a determination module stored on said memory and executable by said processor to determine which implementation artifacts are associated with the error messages;
a mapping module stored on said memory and executable by said processor to map the implementation artifacts to service component artifacts that are associated with the implementation artifacts; and
a display module stored on said memory and executable by said processor to display the error messages and their relationship to the service component artifacts.

11. The apparatus of claim 10, wherein the process server is a runtime engine that supports Service Component Architecture artifacts.

12. The apparatus of claim 10, wherein the service component artifacts are Service Component Architecture (SCA) artifacts.

13. The apparatus of claim 10, wherein the implementation artifacts are implemented in at least one of object-oriented programming languages and XML-centric programming languages.

14. The apparatus of claim 10, further comprising an import module stored on said memory and executable by said processor to import implementation artifacts associated with an error message into a test client.

15. The apparatus of claim 14, wherein the import module is further configured to import data elements associated with the error message into the test client.

16. The apparatus of claim 15, further comprising an invocation module stored on said memory and executable by said processor to invoke, in the test client, the implementation artifacts associated with the error message to operate on the data elements.

17. The apparatus of claim 16, wherein the invocation module is further configured to re-run the implementation artifacts with applied fixes until an error is resolved.

18. The apparatus of claim 10, further comprising a repair module stored on said memory and executable by said processor to enable the user to apply a fix to the implementation artifacts.

19. A computer program product for analyzing and resolving problems in a process server, the computer program product comprising a non-transitory computer-readable storage medium having computer-readable program code embodied therein, the computer-readable program code comprising:
computer-readable program code to receive a log file associated with an application running on the process server when executed by a computer, the application comprising higher-level service component artifacts, and lower-level implementation artifacts used to implement the service component artifacts;
computer-readable program code to identify error messages in the log file when executed by a computer;
computer-readable program code to determine what implementation artifacts are associated with the error messages when executed by a computer;
computer-readable program code to map the implementation artifacts to service component artifacts that are associated with the implementation artifacts when executed by a computer; and
computer-readable program code to display the error messages and their relationship to the service component artifacts when executed by a computer.

20. The computer program product of claim 19, further comprising computer-readable program code encoded on the non-transitory computer-readable storage medium to import implementation artifacts associated with an error message into a test client when executed by a computer.

21. The computer program product of claim 20, further comprising computer-readable program code encoded on the non-transitory computer-readable storage medium to import data elements associated with the error message into the test client when executed by a computer.

22. The computer program product of claim 21, further comprising computer-readable program code encoded on the non-transitory computer-readable storage medium to invoke, in the test client, the implementation artifacts associated with the error message to operate on the data elements when executed by a computer.

23. The computer program product of claim 19, further comprising computer-readable program code encoded on the non-transitory computer-readable storage medium to apply a fix to the implementation artifacts when executed by a computer.

24. The computer program product of claim 23, further comprising computer-readable program code encoded on the non-transitory computer-readable storage medium to re-run the implementation artifacts with applied fixes until an error is resolved when executed by a computer.

* * * * *